(12) United States Patent
Carney et al.

(10) Patent No.: US 6,584,503 B1
(45) Date of Patent: Jun. 24, 2003

(54) METHOD, SYSTEM AND PROGRAM FOR ESTABLISHING NETWORK CONTACT

(75) Inventors: Dennis Michael Carney, Louisville, CO (US); Ryan Hoa Nguyen, Westminster, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/348,966

(22) Filed: Jul. 7, 1999

(51) Int. Cl.[7] ............................................... G06F 13/00
(52) U.S. Cl. ........................ 709/224; 709/221; 709/313
(58) Field of Search ................................. 709/202, 203, 709/217, 219, 223, 224, 220, 221, 313

(56) References Cited

U.S. PATENT DOCUMENTS

| | | |
|---|---|---|
| 5,185,860 A | 2/1993 | Wu |
| 5,602,974 A | 2/1997 | Shaw et al. |
| 5,655,081 A | 8/1997 | Bonnell et al. |
| 5,678,044 A | 10/1997 | Pastilha et al. |
| 5,687,320 A | 11/1997 | Wiley et al. |
| 5,692,111 A | 11/1997 | Marbry et al. |
| 5,699,495 A | 12/1997 | Snipp |
| 5,706,508 A | 1/1998 | Chen et al. |
| 5,708,812 A | 1/1998 | Van Dyke et al. |
| 5,710,885 A | 1/1998 | Bondi |
| 5,727,135 A * | 3/1998 | Webb et al. ................. 395/113 |
| 5,734,642 A | 3/1998 | Vaishnavi et al. |
| 5,742,825 A | 4/1998 | Mathur et al. |
| 5,754,747 A * | 5/1998 | Reilly et al. ................. 395/114 |
| 5,787,252 A | 7/1998 | Schettler et al. |
| 5,796,736 A | 8/1998 | Suzuki |
| 5,819,112 A | 10/1998 | Kusters |
| 5,835,720 A | 11/1998 | Nelson et al. |
| 5,845,058 A | 12/1998 | Shaw et al. |
| 5,909,549 A | 6/1999 | Compliment et al. |
| 5,964,837 A * | 10/1999 | Chao et al. ................. 709/224 |
| 6,055,493 A * | 4/2000 | Ries et al. ................. 702/186 |
| 6,085,237 A * | 7/2000 | Durham et al. ............. 709/221 |
| 6,173,323 B1 * | 1/2001 | Moghe ........................ 709/224 |

OTHER PUBLICATIONS

Jacobs, John. Windows NT Printing: Flow of Control. Microsoft TechNet, vol. 4, Issue 9, Sep. 1999 [online], [retrieved on Nov. 7, 1999]. Retrieved from the Internet <URL: http://technet.microsoft.com/cdonline/content/complete/windows/winnt/winntas/technote/teroubleshooting..>.

Microsoft Corporation. Windows NT Printing Model. Microsoft Corporation, (c) 2000 [online], [retrieved on Jun. 2, 2000]. Retrieved from the Internet <URL: http://msdn-.microsoft.com/library/winresource/dnwinnt/S83B1.HTM> [Available on the Internet before 12/99].

McLaughlin III, Leo J. Line Printer Daemon Protocol. Network Printing Working Group, rfc1179, Aug. 1990 [online], [Retrieved on Jun. 2, 1000].

Microsoft Corporation. Windows NT Printer Drivers. Microsoft Corporation, (c) 2000 [online], [retrievd on Jun. 2, 2000] [Available on the Internet before 12/99].

U.S. patent application Ser. No. 09/129,552, filed Jul. 22, 1998, entitled "Method for Discovering and Registering Agents in a Distributed Network".

* cited by examiner

Primary Examiner—Viet D. Vu
(74) Attorney, Agent, or Firm—David W. Victor; Konrad Raynes Victor & Mann LLP (57) ABSTRACT

Disclosed is a method, system, and program for establishing communication with multiple network devices, such as printers. A detection is made of at least one network device that is not available for communication. A routine is executed at predetermined intervals that sends a message, such as an SNMP message, to each unavailable network device to establish communication with the unavailable network device. A determination is then made as to whether the message sent to each unavailable network device established communication with that network device. Indication is then made that each previously unavailable network device for which the message established communication is available on the network.

27 Claims, 4 Drawing Sheets

METHOD, SYSTEM AND PROGRAM FOR ESTABLISHING NETWORK CONTACT

CROSS-REFERENCE TO RELATED APPLICATIONS

This application is related to the following co-pending and commonly-assigned patent applications, all of which are filed on the same date herewith, and all of which are incorporated herein by reference in their entirety:

"Method, System and Program for Detecting Communication Code Information," to Dennis Michael Camey, Charles David Johnson, Ryan Hoa Nguyen, having Ser. No. 09/348,251;

"Method, System, and Program for Monitoring a Device to Determine a Power Failure at the Device," to Dennis Michael Camey, having Ser. No. 09/349,056, now Pat. No. 6,487,521; and "Method, System, and Program for Monitoring a Device with a Computer Using User Selected Monitoring Settings," to Dennis Michael Carney, Linda Sue Liebelt, and Ryan Hoa Nguyeen, having Ser. No. 09/348,358, now Pat. No. 6,453,268.

BACKGROUND OF THE INVENTION

1. Field of the Invention

The present invention relates to a method, system and program for establishing communication with a network device and, in particular reestablishing communication after communication with the device has been lost.

2. Description of the Related Art

Personal computers and workstations have become standard work tools in most office environments. To further improve the usefulness of the computer systems, most office computer systems have been linked together into an office Local Area Network (LAN). The Local Area Network allows the computer users of different computer systems to easily share information with each other. The network also allows the computer users to share computer hardware such as printers and modems. Many local area networks consist of a centralized network hub that is coupled to all the end computer systems.

This proliferation of network devices has resulted in very large and difficult-to-manage computer networks. For example, a computer network manager may be responsible for installing and maintaining numerous network hubs, network printers, network bridges, routers, gateways, file servers, and remote access servers. To simplify the task of managing all these network devices, network management systems have been devised.

Generally, to support the communication network, network management personnel want to know what nodes are connected to the network, what each node is (e.g., a computer, router, or printer), the status of each node, potential problems with the network, and if possible any corrective measures that can be taken when abnormal status, malfunction, or other notifiable events are detected.

To assist network management personnel in maintaining the operation of the network, a network management framework was developed to define rules describing management information, a set of managed objects and a management protocol. One such protocol is the simple network management protocol (SNMP).

Network management systems need to interact with existing hardware while minimizing the host processor time needed to perform network management tasks. In network management, the host processor or network management station is known as the network manager. A network manager is typically an end-system, such as a mainframe or workstation, assigned to perform the network managing tasks. More than one end-system may be used as a network manager. The network manager is responsible for monitoring the operation of a number of network devices, which are known as managed nodes. The network manager, the corresponding managed nodes and the data links therebetween are known as a subnet.

Many different tasks are performed by the network manager. One such task is to initially discover the different nodes, e.g., end-systems, printers, routers and media devices, connected to the network. After discovery, the network manager continuously determines how the network organization has changed. For example, the network manager determines what new nodes are connected to the network. Another task performed after discovery, is to determine which nodes on the network are operational. In other words, the network manager determines which nodes have failed.

Once the nodes on the network are discovered and their status ascertained, the information is stored in a database and can be displayed along with the status of the different nodes along the network to the network management personnel. Topology maps assist the personnel in the trouble shooting of network problems and with the routing of communications along the networks, especially if nodes have failed.

Through the discovery process, the network manager ascertains its Internet protocol (IP) address, the range of IP addresses for the subnet components (i.e., the subnet mask), a routing table for a default router and address resolution protocol (ARP) cache tables from known and previously unknown nodes with SNMP agents. To ascertain the existence of network nodes, the discovery process performs configuration polls of known nodes and retrieves the ARP cache tables from the known nodes, and the routing tables. The network manager then verifies the existence of those nodes listed in these tables that it has not previously recorded in its database.

Network manager systems can discover nodes and verify the existence and status of nodes by sending to each node an Internet control message protocol (ICMP) poll and waiting for a response. The ICMP poll is also known as a ping. If no response is received after a specified period of time, the node is determined to be nonoperational or to have failed. Instances may occur when the ping is not received by the node, or the node is busy performing another task when the ping is sent. Thus, to verify that a node has actually failed, the network manager sends out a sequence of pings. Each successive ping is transmitted if a corresponding acknowledgment is not received during an associated scheduled timeout interval.

One specific application of these network management functions can be found in the network printer art. Printer port monitor applications exist on any number of computers on a network and serve a network manager role with respect to the network printers. The printers are representative of the nodes which are monitored and managed by the port monitors.

Among the many functions of a typical printer port monitor include the periodic status polling of the printers to determine whether they still respond to queries. When a printer stops responding to queries, either due to loss of power or some other condition, then port monitors act in different ways, depending upon the type of monitor.

Some monitors continue their status polling at, for example, 5 second intervals as if nothing had happened. However this is wasteful of both the port monitor processor cycles and network bandwidth since it serves no purpose to continue polling a non-responsive printer. The present invention therefore provides an improved technique for verifying the status of network nodes while reducing the amount of polling, on the network.

SUMMARY OF THE PREFERRED EMBODIMENTS

To overcome the limitations in the prior art described above, preferred embodiments disclose a method, system, and program for establishing communication with multiple network devices. A detection is made of at least one network device that is not available for communication. A routine is executed at predetermined intervals that sends a message to each unavailable network device to establish communication with the unavailable network device. A determination is then made as to whether the message sent to each unavailable network device established communication with that network device. Indication is then made that each previously unavailable network device for which the message established communication is available on the network.

In further embodiments, the routine that sends a message to each unavailable network device is executed by a thread that initiates a separate thread for each message to transmit to the unavailable network devices.

In still further embodiments, the message sent to each unavailable network device comprises the minimum form of message which is sufficient to establish communications with the unavailable network device.

In further embodiments, the sending of all other messages to each unavailable network device is discontinued.

In still further embodiments, a plurality of codes are provided. In such case, the message to each unavailable network device includes one code. The network devices only respond to messages using a code that the network device recognizes. The routine sends subsequent messages to each network device including one code, until one of the following events occurs, communication is established with the network device or all of the codes have been included in messages to the network device that failed to establish communication.

Preferred embodiments efficiently use processing and network resources to reestablish communication with a network device after communication with the device has been lost, such as the case when the device no longer responds to queries from the network. For all such devices, preferred embodiments use a single thread at predetermined intervals to send a message in an attempt to reestablish communications. This conserves network bandwidth by limiting the messages to the network devices.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
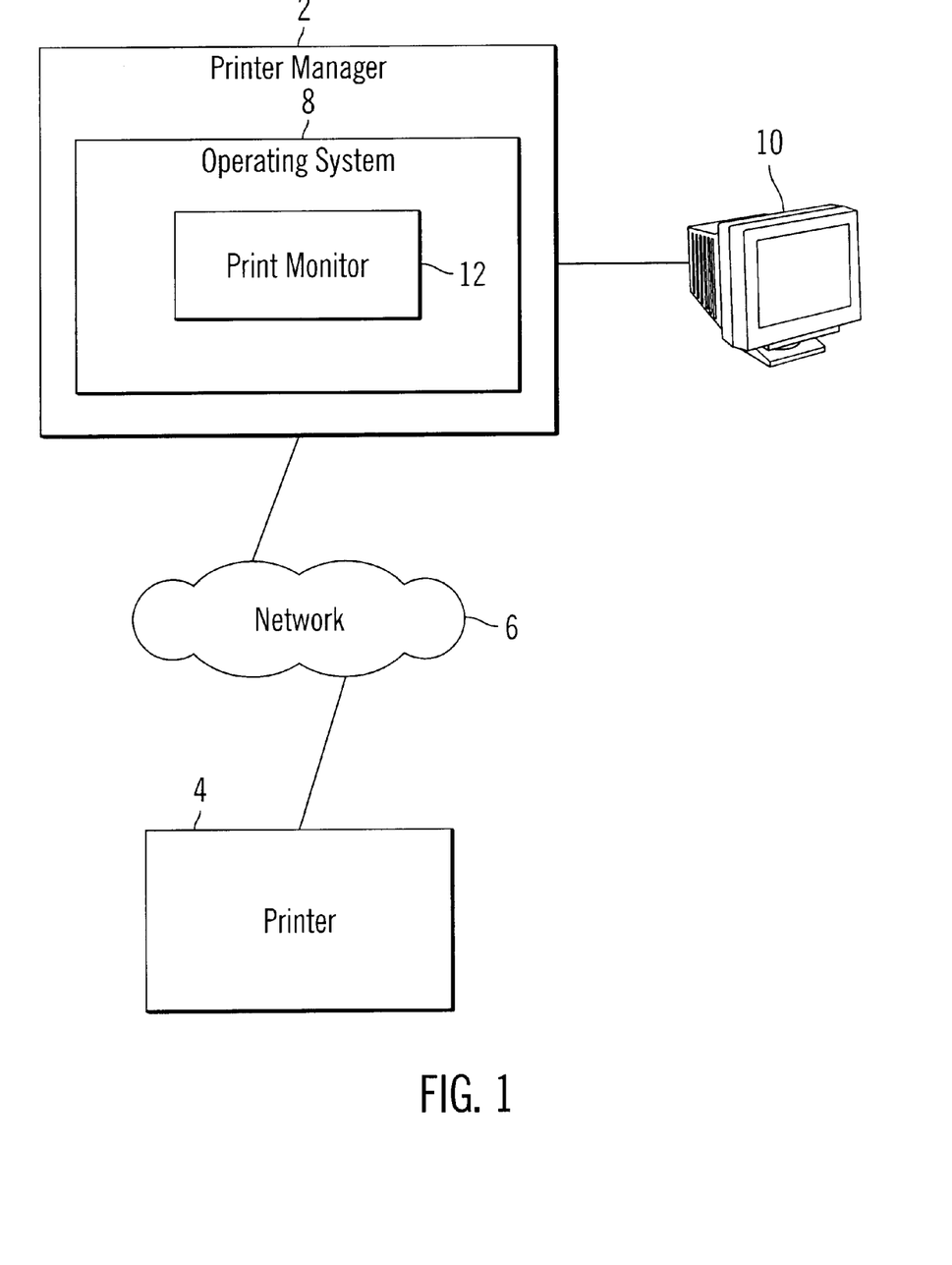
FIG. 1 is a block diagram illustrating a computing environment in which preferred embodiments of the present invention are implemented.

FIG. 1 illustrates a computing environment in which preferred embodiments of the present invention are implemented. A printer manager 2 is in communication with a printer 4 via a network 6. The network 6 may be comprised of any suitable network architecture known in the art, such as LAN, Ethernet, WAN, System Area Network (SAN), Token Ring, LocalTalk, TCP/IP, the Internet, etc. Alternatively, there may be separate and different networks between the printer manager 2 and the printer 6.

The printer manager 2 is preferably comprised of a computer, either a client or server, that manages printer operations over a network, such as performing spooling and queuing for print jobs. The computer 2 may be any computer device known in the art, such as a desktop computer, laptop computer, workstation, mainframe, server, personal digital assistant (PDA), etc. The computer 2 would include an operating system 8 such as AIX, OS/390, UNIX, OS/2, MVS, WINDOWS NT, 95/98, LINUX, etc. The printer manager 2 may also include software to allow a network administrator or user to manage network printers, such as the IBM Network Printer Manager software solutions to submit and monitor print jobs, and perform other network printer manager functions, Attached to the printer manager 2 is a display monitor 10, which may be comprised of any computer display device known in the art. An input device (not shown) would also be provided with the printer manager 2 to allow a systems administrator or other user to enter data into the printer manager 2. This input device may be comprised of any input means known in the art, including a mouse, keyboard, touch screen display, voice activated input, electronic pen, etc.

The printer 4 may be any printer, plotter, three dimensional model builder or other similar output device known in the art. In preferred embodiments, the printer manager 2 and printer 4 include a network card and one or more ports for intercommunication over network 6.

In preferred embodiments, the printer manager 2 and printer 4 may communicate using the Simple Network Management Protocol (SNMP), or any other suitable network protocol known in the art, such as TCP/IP, LPR, etc. The SNMP protocol is described in Request for Comments No. 1157 (May 1990), entitled "A Simple Network Management Protocol (SNMP)," and No. 1759 (March 1995), entitled "Printer MIB," which documents are incorporated herein by reference in their entirety. The SNMP protocol provides for the interoperability of different devices communicating over a TCP/IP network, such as the Internet.

In preferred embodiments, the printer manager 2 would communicate with the printer 4 via a port, and monitor that port for printer communications. Likewise, the printer 4 would dedicate a port for communicating with the printer manager 2 in a manner known in the art, such as the SNMP art.

The printer manager 2 further includes a printer monitor program 12 component which is used to communicate with the printer 4, and perform operations such as sending print jobs to the printer and monitoring printer status. The printer monitor 12 would incorporate the communication protocol, such as SNMP, to communicate directly with the printer 4 to perform the printer manager functions.

Reestablishing Network Contact

The preferred embodiment provides a network management method and system which improves the discovery process and the status monitoring process of current network management systems. During node or printer discovery, the print monitor sends polls to each printer. The monitor then waits for a response from each printer. The response may include information, such as the printer IP address, status information regarding the printer, the type of printer, and the number of interfaces in the printer. When the response is received, the printer information is stored in a database. Following discovery, the print monitor then conducts periodic status polling of all printers.

When contact with a printer is lost, as detected by the periodic status polling, then the preferred embodiment sets a bit in a data structure field to a TRUE setting. Upon setting this to TRUE, subsequent routine status polling is not made to that printer. Thus the system discontinues the sending of all other messages to each unavailable printer thereby reducing network traffic. Instead, a central rediscovery thread in the port monitor application assumes responsibility for that printer. A thread is part of a computer program that can execute independently of other parts. Operating systems that support multithreading enable programmers to design programs whose threaded parts can execute concurrently.

The rediscovery thread of the preferred embodiment performs operations with respect to all printers on the network that stop responding to queries. Further, the rediscovery thread remains dormant for a period of time, then "wakes up" periodically and goes through the list of all printers on the network. From that list, the thread determines which printers are in need of rediscovery as determined by the TRUE setting in the data structure field. For each lost printer, the rediscovery thread initiates a separate thread that makes just one attempt to re-establish contact with that printer.

In preferred embodiments, the attempt to re-establish contact comprises sending the minimum form of message which is sufficient to establish communications with the previously unavailable printer. Thus in the SNMP protocol environment, a single "SNMP ping" is sent onto the network. This ping constitutes one, simple SNMP request for one small item of information that is known to always exist about the lost printer. For example, an SNMP Get command could be sent which would seek a single object identifier ("oid") from the MIB that details the type of the device.

If the ping fails, then the separate thread terminates.

When this ping is sent, the same SNMP community name, or code, is used that was used to communicate with the printer before it stopped responding to queries. A primary protocol used by SNMP for communication is the User Datagram Protocol (UDP). Under UDP, a session is not established before the transmission of data (that is, there is no three-way handshake, as used with transmission control protocol, (TCP)). This means that a logon with a user ID and password is not performed prior to transmission of data. This can be considered a security hole because the software that is receiving a datagram has no way to verify the identity of the software that sent the datagram.

SNMP does however provide a simple form of security by utilizing what is known as a community. During installation of the manager and agent software, the installer enters one or more community names. For example a community name could be the word public. The network management software is then configured to only accept datagrams from or send datagrams to specific communities. In addition to the community names, the network software can be configured to only allow the receipt of datagrams from specific IP addresses. Agents are configured with the IP addresses of network managers to which they can send unsolicited messages.

Thus in order to communicate with a device, such as a printer, using SNMP, an application must use some SNMP community name. Most applications use either the community name "public" or ask the user for the community name to use.

Therefore, it is reasonable to assume that in the majority of instances, the reason for the loss of communications with a device has to do with a loss of power or other condition related to the machine. However, since there is a possibility that changes were made to the community name(s) on the device, the preferred embodiment will periodically send a series of pings using all known community names on the system. Thus if a response is received to a ping with a different community name, then the new name will be used to reestablish communications.

If there is a response to the ping, then a full discovery procedure is activated for that printer. This full discovery is necessary since it is possible that during the time that the printer was down, its configuration may have changed. For example, a new paper tray may have been added or even a different printer may have been placed at the old location with the old IP address. Upon completion of the full discovery procedure, the bit in the data structure field is set to FALSE which then tells the system that the printer or device is responding to queries whereupon the separate thread terminates.

Figure 2:
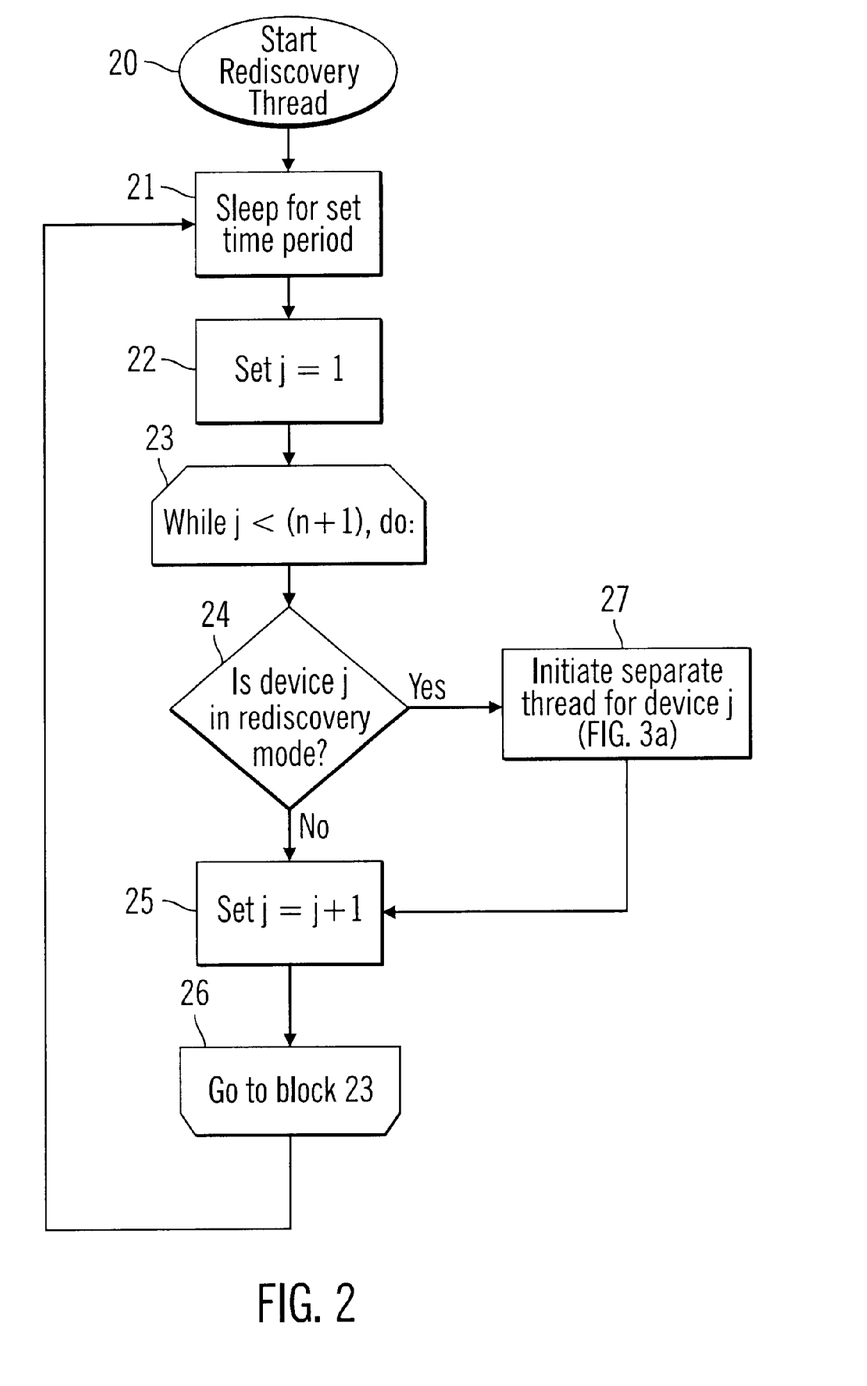
FIGS. 2, 3a, and 3b illustrate logic to reestablish communication with a network device in accordance with preferred embodiments of the present invention.
Figure 3A:
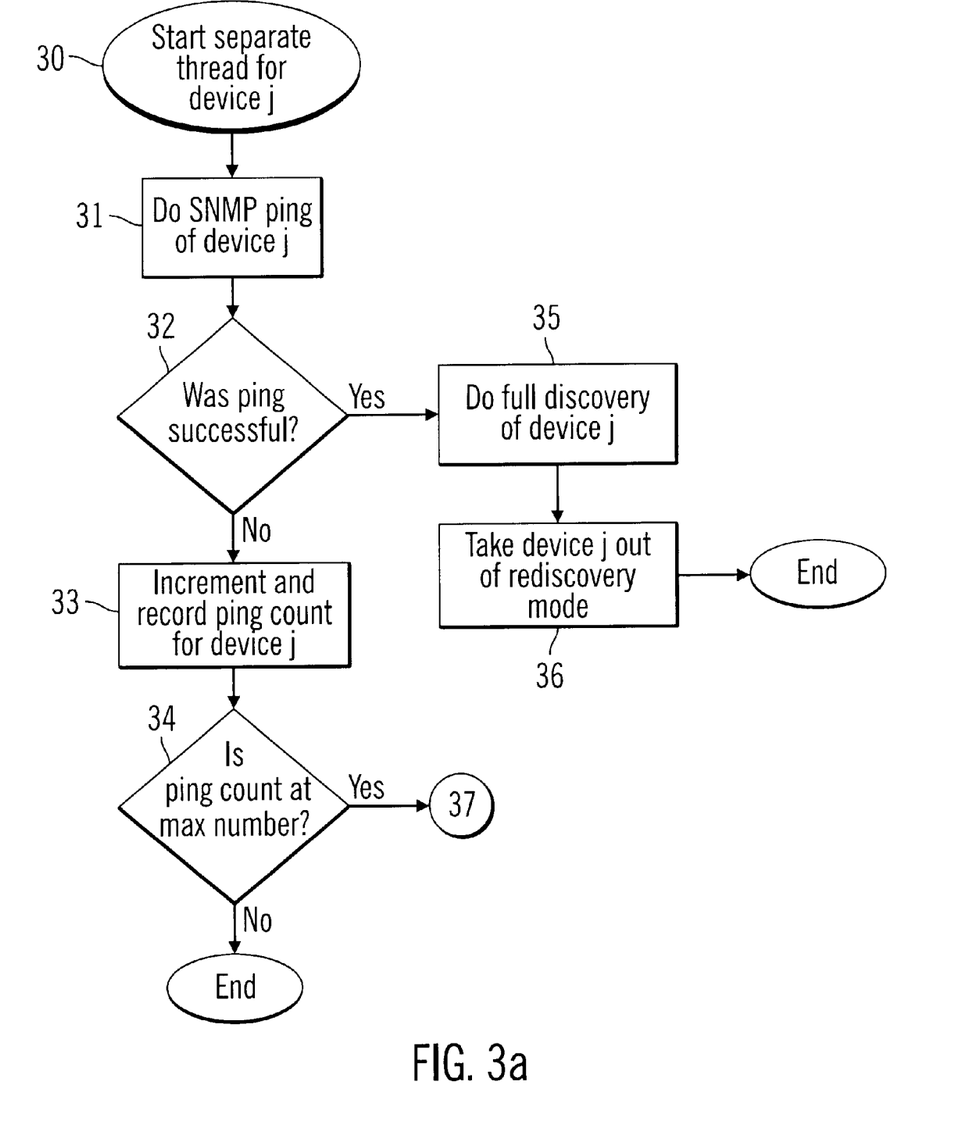
Figure 3B:
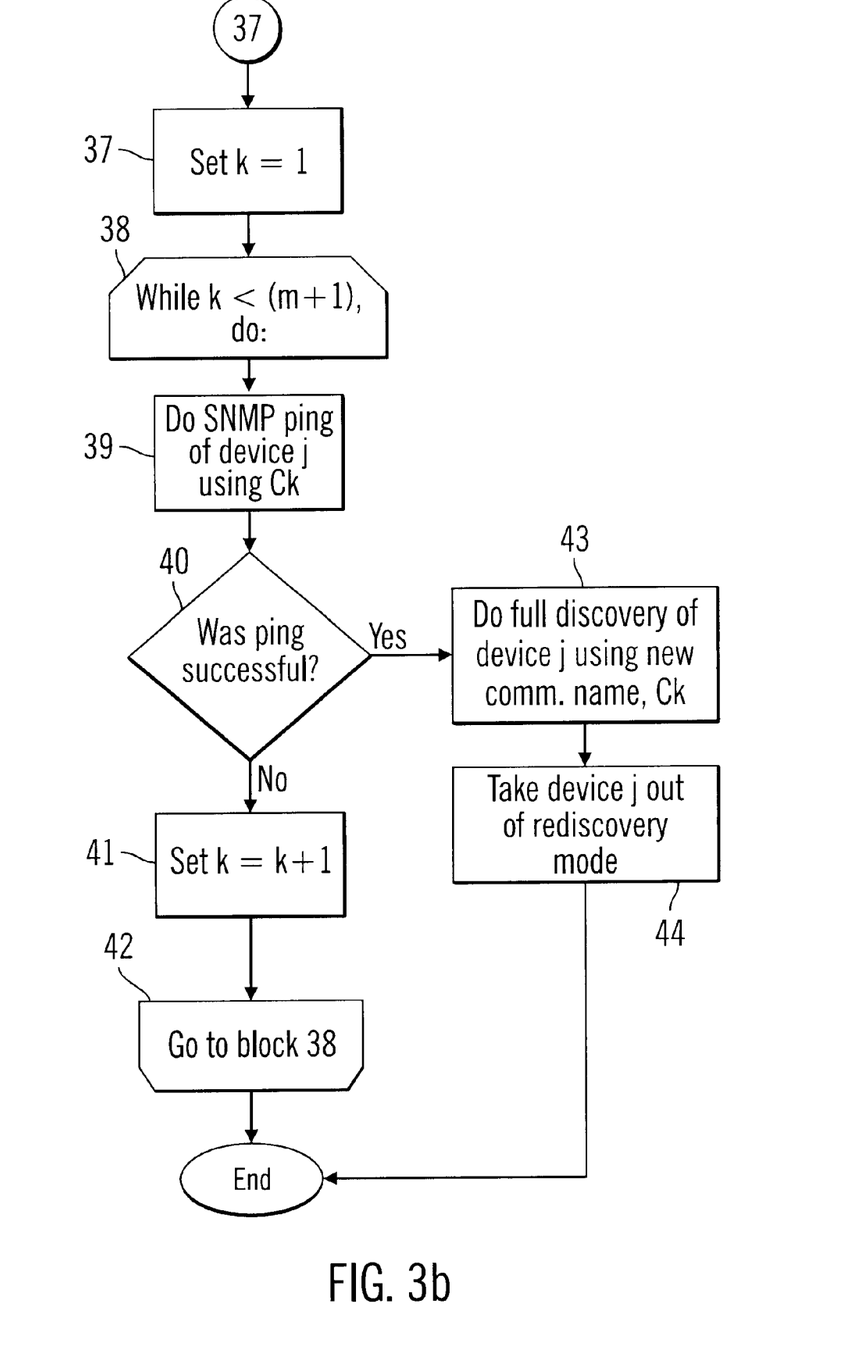

FIGS. 2, 3a and 3b illustrate the logic for the central rediscovery thread and one separate thread of the preferred embodiment. The rediscovery thread "wakes up" at periodic intervals. For only those network devices which are in the rediscovery mode, a separate thread is initiated for each device in this mode. The separate thread sends a single SNMP ping to each such device. If the ping was successful, then the device is now communicating and a full discovery procedure is initiated for that device. However if the ping was not successful, then the separate thread terminates. After a certain number of failing pings to any given device, other community names are used in attempting to get the device to respond to a ping.

In FIG. 2 control starts at block 21 where there exists a period of inactivity. The purpose of this is to conserve network traffic since there is rarely a need for continuous attempts to rediscover a network device which is down. After the elapsed time, control transfers to block 22 where counter j is set to 1. Blocks 23 through 27 constitute a loop for selectively sending an SNMP ping via a separate thread to each device which is in the rediscovery mode. In block 23, "n" corresponds to the number of different devices being monitored in the network. Control transfers to block 24 where it is determined whether device j is in the rediscovery mode. If it is not, control shifts to block 25 where counter j is incremented by one. Control loops to block 24, via blocks 26 and 23, where it is determined whether device (j+1) is in rediscovery mode. This process continues for all devices which are not in this mode.

Returning to block 24 however, if device j is in rediscovery mode, then a separate thread is initiated for device j. (Block 27). While that separate thread is running, however, control in the central rediscovery thread transfers to block 25 where counter "j" is incremented by one and the above described process is repeated. Thus this is multithreading process.

FIGS. 3a and 3b illustrate the logic for the separate thread. An SNMP ping is sent to device j (block 31). A determination is made as to whether the ping was successful. (block 32) If it was successful, then that indicates-that device j is now operational and responding to queries. In that case, control transfers to block 35 where a full discovery procedure is initiated for device j. After completion of the full discovery of device j, it is taken out of rediscovery mode by setting the bit in the data structure field for device j to FALSE. (block 36) At that point the separate thread terminates.

Returning to block 32, if the ping was not successful, then control transfers to block 33 where a counter increments and records the number of unsuccessful pings for device j. Control transfers to block 34 where a determination is made as to whether a maximum number of unsuccessful pings has been made for device j. If not, then the separate thread terminates.

Returning to block 34, if however the ping count for device j has reached the pre-set maximum number, then control transfers to block 37 (FIG. 3b) where counter "k" is set to 1, and control transfers to block 38. Blocks 38 through 44 constitute a loop for selectively trying all known community names in attempting to rediscover device j.

Prior to this point in the rediscovery and separate threads, all pings to device j were sent using the last community name used by device j prior to losing communications with it. Since in most cases the cause of communications loss has nothing to do with a change in community names, this embodiment operates in a matter to conserve network traffic by using the last known name for a set number of pings before going through the portion of the thread depicted in FIG. 3b.

In block 38, "m" represents the number of different known community names which the print monitor 12 maintains. Control transfers to block 39 where an SNMP ping is sent to device j using community name C1. A determination is made as to whether the ping was successful. (Block 40) If it was successful, then it is known that device j is now responding to queries. In that case, control transfers to block 43 where a full discovery procedure is initiated for device j using the new community name, C1. After completion of the full discovery of device j, it is taken out of rediscovery mode by setting the bit in the data structure for device j to FALSE. (block 44) At that point the separate thread terminates.

Returning to block 40, if the ping using community name C1 was not successful, then control transfers to block 41 where counter "k" is incremented. Control then loops to block 39, via blocks 42 and 38, and the previously described process is repeated using a different community name, C(k+1). This process continues until all community names have been tried at which point the separate thread terminates.

From FIGS. 2, 3a and 3b, it can be appreciated that with the use of one central rediscovery thread as depicted in FIG. 2, there can result several separate threads in simultaneous operation if there are several network devices in rediscovery mode. Each separate thread would be dedicated to sending a single SNMP ping to one network device as depicted in FIGS. 3a and 3b. Where there are several network devices in the rediscovery mode, then an equal number of separate threads would be initiated and operating.

Conclusions And Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, or a file server providing access to the programs via a network transmission line, holographic unit, etc. Of course, those skilled in the art will recognize many modifications may be made to this configuration without departing from the scope of the present invention.

Preferred embodiments were described with respect to printers as the managed devices. However, the inventions claimed herein apply to any aspect of any type of device attached to the network or computer, where the computer functions as the managing device and the managed object may be any device known in the art capable of connecting to the computer directly, e.g., a parallel port or serial port, or through a network, such as an intranet or the Internet.

The logic of FIGS. 2, 3a and 3b is preferably implemented within the printer monitor application. However, various functions may be implemented in different application programs involving the management of network devices. This logic is for illustrative purposes. Additional or alternative steps may be performed in addition to those illustrated in the logic. Further, the order of the steps in the preferred logic may also vary.

In preferred embodiments, the printer monitor application 12 is implemented in an object oriented design program such as JAVA, C++, or non-object oriented languages, such as Basic, Pascal, FORTRAN, etc.**

**AIX and OS/2 are registered trademarks of IBM and OS/390 and MVS are trademarks of IBM; WINDOWS is a registered trademark of Microsoft Corporation; UNIX is a registered trademark licensed by the X/Open Company LTD; JAVA is a trademark of Sun Microsystems, Inc.; Linux is a trademark of Linus Torvalds.

Preferred embodiments were described as implemented in a network printing system with respect to managing the operations of printer devices. However, the embodiments of the present invention may be applied to any network system in which a computer monitors and manages one or more attached components. The preferred embodiments are not limited to monitoring and managing only printers and related output devices. For instance, preferred embodiments could apply to managing facsimile machines, copiers, telephones, display devices, input/output devices, storage devices, communication systems, routers, brouters, switches etc., in communication with the network system.

In summary, preferred embodiments disclose a method, system, and program for establishing communication with multiple network devices. A detection is made of at least one network device that is not available for communication. A routine is executed at predetermined intervals that sends a message to each unavailable network device to establish communication with the unavailable network device. A determination is then made as to whether the message sent to each unavailable network device established communication with that network device. Indication is then made that each previously unavailable network device for which the message established communication is available on the network.

The foregoing description of the preferred embodiments of the invention has been presented for the purposes of illustration and description. It is not intended to be exhaustive or to limit the invention to the precise form disclosed.

Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for establishing communication with multiple network devices, comprising:
    (a) detecting with a first routine that at least one network device is not available for communication;
    (b) executing a second routine at predetermined intervals that sends a message to each unavailable network device to establish communication with the unavailable network device;
    (c) determining whether the message sent to each unavailable network device established communication with that network device; and
    (d) indicating that each previously unavailable network device for which the message established communication is available on the network.

2. A method for establishing communication with multiple network devices, comprising:
    (a) detecting that at least one network device is not available for communication;
    (b) executing a routine at predetermined intervals that sends a message to each unavailable network device to establish communication with the unavailable network device, wherein the execution of the routine is performed by a thread that initiates a separate thread for each message to transmit to the unavailable network devices;
    (c) determining whether the message sent to each unavailable network device established communication with that network device; and
    (d) indicating that each previously unavailable network device for which the message established communication is available on the network.

3. The method of claim 1, wherein the message sent to each unavailable network device comprises the minimum form of message which is sufficient to establish communications with the unavailable network device.

4. A method for establishing communication with multiple network devices, comprising:
    (a) detecting that at least one network device is not available for communication;
    (b) executing a routine at predetermined intervals that sends a message to each unavailable network device to establish communication with the unavailable network device;
    (c) discontinuing the sending of all other messages to each unavailable network device except for the message of step (b);
    (d) determining whether the message sent to each unavailable network device established communication with that network device; and
    (e) indicating that each previously unavailable network device for which the message established communication is available on the network.

5. A method for establishing communication with multiple network devices, comprising:
    (a) detecting that at least one network device is not available for communication, wherein a code must be used to communicate with the network devices;
    (b) maintaining at least two codes;
    (c) executing a routine at predetermined intervals that sends a message to each unavailable network device to establish communication with the unavailable network device, wherein the message to each unavailable network device is a first message that includes one code, and wherein the network devices only respond to messages using a code that the network device recognizes;
    (d) sending a second message to each network device for which the first message failed to establish communication including a code that is different from the code sent in the first message;
    (e) determining whether the message sent to each unavailable network device established communication with that network device; and
    (f) indicating that each previously unavailable network device for which the message established communication is available on the network.

6. The method of claim 5, further comprising sending the first message a predetermined number of times to each network device until communication is established with the network device, wherein the second message is sent to each network device for which sending the first message the predetermined number of times fails to establish communication.

7. The method of claim 5, further comprising:
    determining whether the second message established communication with each network device to which the second message was sent; and
    sending additional messages to each network device for which previous messages failed to establish communication until one of: (i) communication is established with the network device and (ii) all of the codes have been included in messages to the network device that failed to establish communication, wherein the code included in each additional message is different from the codes included in each previous message to the network device.

8. The method of claim 5, wherein the SNMP protocol is used to communicate with network devices and wherein the codes comprise SNMP community names.

9. The method of claim 1, wherein the network devices include at least one printer.

10. A system for establishing communication with multiple network devices, comprising:
    a processing unit capable of communicating with a network device; and
    program logic executed by the processing unit, comprising:
        (a) means for detecting with a first routine that at least one network device is not available for communication;
        (b) means for executing a second routine at predetermined intervals that sends a message to each unavailable network device to establish communication with the unavailable network device;
        (c) means for determining whether the message sent to each unavailable network device established communication with that network device; and
        (d) means for indicating that each previously unavailable network device for which the message established communication is available on the network.

11. A system for establishing communication with multiple network devices, comprising:
    a processing unit capable of communicating with a network device; and program logic executed by the processing unit, comprising:
- (a) means for detecting that at least one network device is not available for communication;
- (b) means for executing a routine at predetermined intervals that sends a message to each unavailable network device to establish communication with the unavailable network device, wherein the program logic for execution of the routine that sends a message to each unavailable network device is performed by a thread that initiates a separate thread for each message to transmit to the unavailable network devices;
- (c) means for determining whether the message sent to each unavailable network device established communication with that network device; and
- (d) means for indicating that each previously unavailable network device for which the message established communication is available on the network.

12. The system as claimed in claim 10, wherein the message sent to each unavailable network device comprises the minimum form of message which is sufficient to establish communications with the unavailable network device.

13. A system for establishing communication with multiple network devices, comprising:
a processing unit capable of communicating with a network device; and
program logic executed by the processing unit, comprising:
- (a) means for detecting that at least one network device is not available for communication;
- (b) means for executing a routine at predetermined intervals that sends a message to each unavailable network device to establish communication with the unavailable network device;
- (c) means for discontinuing the sending of all other messages to each unavailable network device except for the message sent by the means for executing of step (b);
- (d) means for determining whether the message sent to each unavailable network device established communication with that network device; and
- (e) means for indicating that each previously unavailable network device for which the message established communication is available on the network.

14. A system for establishing communication with multiple network devices, comprising:
a processing unit capable of communicating with a network device; and
program logic executed by the processing unit, comprising:
- (a) means for detecting that at least one network device is not available for communication, wherein a code must be used to communicate with the network devices;
- (b) means for executing a routine at predetermined intervals that sends a message to each unavailable network device to establish communication with the unavailable network device;
- (c) means for determining whether the message sent to each unavailable network device established communication with that network device;
- (d) means for maintaining at least two codes, wherein the message to each unavailable network device is a first message that includes one code, and wherein the network devices only respond to messages using a code that the network device recognizes;
- (e) means for sending a second message to each network device for which the first message failed to establish communication including a code that is different from the code sent in the first message; and
- (f) means for indicating that each previously unavailable network device for which the message established communication is available on the network.

15. The system as claimed in claim 14, further comprising means for sending the first message a predetermined number of times to each network device until communication is established with the network device, wherein the second message is sent to each network device for which sending the first message the predetermined number of times fails to establish communication.

16. The system as claimed in claim 14, further comprising:
means for determining whether the second message established communication with each network device to which the second message was sent; and
means for sending additional messages to each network device for which previous messages failed to establish communication until one of: (i) communication is established with the network device and (ii) all of the codes have been included in messages to the network device that failed to establish communication, wherein the code included in each additional message is different from the codes included in each previous message to the network device.

17. The system as claimed in claim 14, wherein the SNMP protocol is used to communicate with network devices and wherein the codes comprise SNMP community names.

18. The system as claimed in claim 10, wherein the network devices include at least one printer.

19. An article of manufacture for use in establishing communication with multiple network devices, the article of manufacture comprising a computer usable media including at least one computer program embedded therein that causes the computer to perform:
- (a) detecting with a first routine that at least one network device is not available for communication;
- (b) executing a second routine at predetermined intervals that sends a message to each unavailable network device to establish communication with the unavailable network device;
- (c) determining whether the message sent to each unavailable network device established communication with that network device; and
- (d) indicating that each previously unavailable network device for which the message established communication is available on the network.

20. An article of manufacture for use in establishing communication with multiple network devices, the article of manufacture comprising a computer usable media including at least one computer program embedded therein that causes the computer to perform:
- (a) detecting that at least one network device is not available for communication;
- (b) executing a routine at predetermined intervals that sends a message to each unavailable network device to establish communication with the unavailable network device, wherein the execution of the routine that sends a message to each unavailable network device is performed by a thread that initiates a separate thread for each message to transmit to the unavailable network devices;
- (c) determining whether the message sent to each unavailable network device established communication with that network device; and (d) indicating that each previously unavailable network device for which the message established communication is available on the network.

21. The article of manufacture of claim 19, wherein the message sent to each unavailable network device comprises the minimum form of message which is sufficient to establish communications with the unavailable network device.

22. An article of manufacture for use in establishing communication with multiple network devices, the article of manufacture comprising a computer usable media including at least one computer program embedded therein that causes the computer to perform:

(a) detecting that at least one network device is not available for communication;

(b) executing a routine at predetermined intervals that sends a message to each unavailable network device to establish communication with the unavailable network device;

(c) discontinuing the sending of all other messages to each unavailable network device except for the message of step (b);

(d) determining whether the message sent to each unavailable network device established communication with that network device; and (e) indicating that each previously unavailable network device for which the message established communication is available on the network.

23. An article of manufacture for use in establishing communication with multiple network devices, the article of manufacture comprising a computer usable media including at least one computer program embedded therein that causes the computer to perform:

(a) detecting that at least one network device is not available for communication wherein a code must be used to communicate with the network devices;

(b) maintaining at least two codes;

(c) executing a routine at predetermined intervals that sends a message to each unavailable network device to establish communication with the unavailable network device, wherein the message to each unavailable network device is a first message that includes one code, and wherein the network devices only respond to messages using a code that the network device recognizes;

(d) sending a second message to each network device for which the first message failed to establish communication including a code that is different from the code sent in the first message;

(e) determining whether the message sent to each unavailable network device established communication with that network device; and (f) indicating that each previously unavailable network device for which the message established communication is available on the network.

24. The article of manufacture of claim 23, further comprising sending the first message a predetermined number of times to each network device until communication is established with the network device, wherein the second message is sent to each network device for which sending the first message the predetermined number of times fails to establish communication.

25. The article of manufacture of claim 23, further comprising:

determining whether the second message established communication with each network device to which the second message was sent; and sending additional messages to each network device for which previous messages failed to establish communication until one of: (i) communication is established with the network device and (ii) all of the codes have been included in messages to the network device that failed to establish communication, wherein the code included in each additional message is different from the codes included in each previous message to the network device.

26. The article of manufacture of claim 23, wherein the SNMP protocol is used to communicate with network devices and wherein the codes comprise SNMP community names.

27. The article of manufacture of claim 19, wherein the network devices include at least one printer.

* * * * *